United States Patent [19]

Nakamura et al.

[11] Patent Number: 6,073,022
[45] Date of Patent: Jun. 6, 2000

[54] RADIO CHANNEL INITIAL TRANSMISSION SCHEME FOR MOBILE COMMUNICATION SYSTEM

[75] Inventors: Takehiro Nakamura; Jyunichiro Hagiwara; Etsuhiro Nakano, all of Yokosuka, Japan

[73] Assignee: NTT Mobile Communications Network Inc., Tokyo, Japan

[21] Appl. No.: 08/893,760

[22] Filed: Jul. 11, 1997

[30] Foreign Application Priority Data

Jul. 12, 1996 [JP] Japan .................................. 8-183536

[51] Int. Cl.[7] ...................................................... H04B 7/20
[52] U.S. Cl. .......................... 455/450; 455/435; 455/434
[58] Field of Search .................................. 455/422, 445, 455/517, 435, 343, 464, 434, 462, 463, 450, 69; 370/318, 350, 335; 375/200

[56] References Cited

U.S. PATENT DOCUMENTS 5,604,730 2/1997 Tiedemann, Jr. ........................ 455/69
5,828,662 10/1998 Jalali et al. ............................ 370/335

*Primary Examiner*—Dwayne D. Bost
*Assistant Examiner*—Raymond B. Persino
*Attorney, Agent, or Firm*—Oblon, Spivak, McClelland, Maier & Neustadt, P.C.

[57] ABSTRACT

A radio channel initial transmission scheme for a mobile communication system which is capable of reducing an unnecessary interference with respect to the other radio channels as well as an unnecessary consumption of a battery of a mobile station. In the present invention, this is realized by not carrying out a transmission of the unnecessary general information during an initial period of a radio channel set up. More specifically, only the constantly necessary information among radio channel transmission signals is initially transmitted from a transmitting side of the base station and the mobile station, at a time of setting up a radio channel between the base station and the mobile station, and then the constantly necessary information and the general information other than the constantly necessary information are subsequently transmitted from the transmitting side, after a receiving side of the base station and the mobile station becomes ready to receive the radio channel properly.

12 Claims, 4 Drawing Sheets

RADIO CHANNEL INITIAL TRANSMISSION SCHEME FOR MOBILE COMMUNICATION SYSTEM

BACKGROUND OF THE INVENTION

1. Field of the Invention

The present invention relates to a radio channel initial transmission scheme for a mobile communication system in which a base station and a mobile station carry out communication through a radio channel, and more particularly, to a radio channel initial transmission scheme to be used in starting a set up of a radio channel between a base station and a mobile station.

2. Description of the Background Art

In the mobile communication system, a radio channel between a base station and a mobile station is used to repeatedly transmit a radio frame as shown in FIG. 1. This radio channel mainly comprises constantly necessary information such as a synchronization information for a radio channel and a transmission power control information, and other general information which is not constantly necessary such as a user information and a control information.

In a case of radio channel set up at a time of call origination/termination connection or handover start, the transmitting side in the communication of the base station and the mobile station has conventionally been transmitting not just the constantly necessary information but also the other general information over the entire period of time of the radio frame, despite of the fact that the user information and the control information are not yet provided during an initial period between a radio channel transmission start and a synchronization establishing.

Because of this unnecessary transmission of the other general information such as the user information and the control information over the entire period of time of the radio frame, including the initial period between a radio channel transmission start and a synchronization establishing during which the user information and the control information are still unnecessary, the conventional mobile communication system has been associated with a problem that this unnecessary transmission causes an unnecessary interference with respect to the other radio channels as well as an unnecessary consumption of a battery of a mobile station especially in the uplink radio channel.

In particular, in a case of the CDMA (Code Division Multiple Access) mobile communication system, an amount of interference significantly affects a system capacity so that an increase of interference can give rise to a serious problem regarding a considerable lowering of a system capacity.

SUMMARY OF THE INVENTION

It is therefore an object of the present invention to provide a radio channel initial transmission scheme for a mobile communication system which is capable of reducing an unnecessary interference with respect to the other radio channels as well as an unnecessary consumption of a battery of a mobile station. In the present invention, this is realized by not carrying out a transmission of the unnecessary general information during an initial period of a radio channel set up.

According to one aspect of the present invention there is provided a method of radio channel initial transmission in a mobile communication system in which a base station and a mobile station carry out communication through radio channels, the method comprising the steps of: (a) initially transmitting only constantly necessary information among radio channel transmission signals, from a transmitting side of the base station and the mobile station, at a time of setting up a radio channel between the base station and the mobile station; and (b) subsequently transmitting the constantly necessary information and general information other than the constantly necessary information from the transmitting side, after a receiving side of the base station and the mobile station becomes ready to receive the radio channel properly.

According to another aspect of the present invention there is provided a radio station apparatus for use as a base station or a mobile station in a mobile communication system in which the base station and the mobile station carry out communication through radio channels, comprising: a constantly necessary information generation unit for generating constantly necessary information among radio channel transmission signals; a general information generation unit for generating general information other than the constantly necessary information; and a transmission unit for initially transmitting only the constantly necessary information at a time of setting up a radio channel between the base station and the mobile station, and subsequently transmitting the constantly necessary information and the general information, after another radio station used as another one of the base station and the mobile station becomes ready to receive the radio channel properly.

Other features and advantages of the present invention will become apparent from the following description taken in conjunction with the accompanying drawings.

DETAILED DESCRIPTION OF THE PREFERRED EMBODIMENTS

Figure 1:
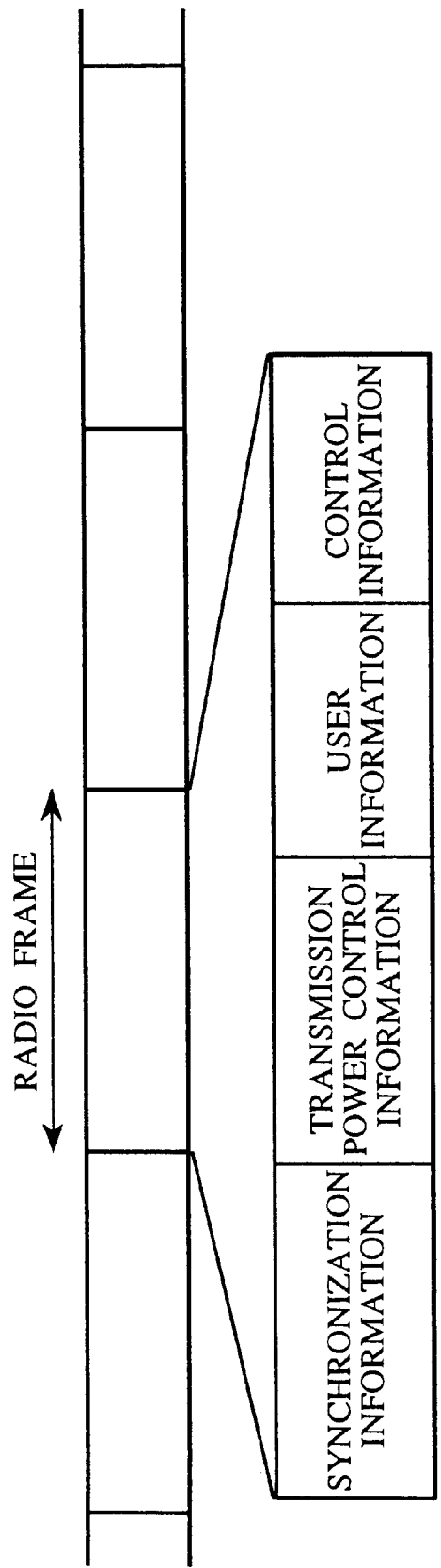
FIG. 1 is a diagram showing a radio frame used in the mobile communication system in general.
Figure 2:
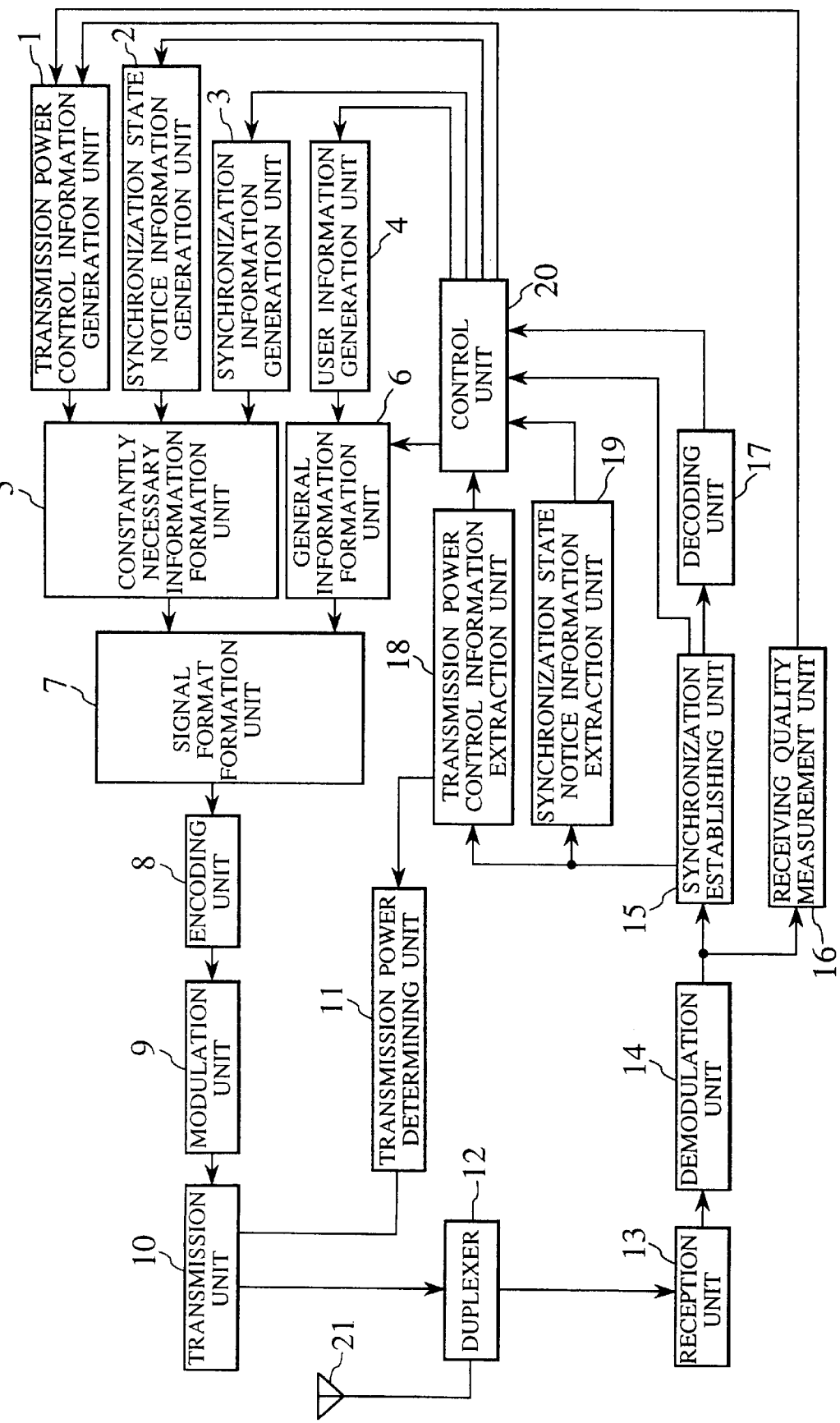
FIG. 2 is a block diagram of a radio station apparatus for realizing a radio channel initial transmission scheme for a mobile communication system according to the present invention.
Figure 3:
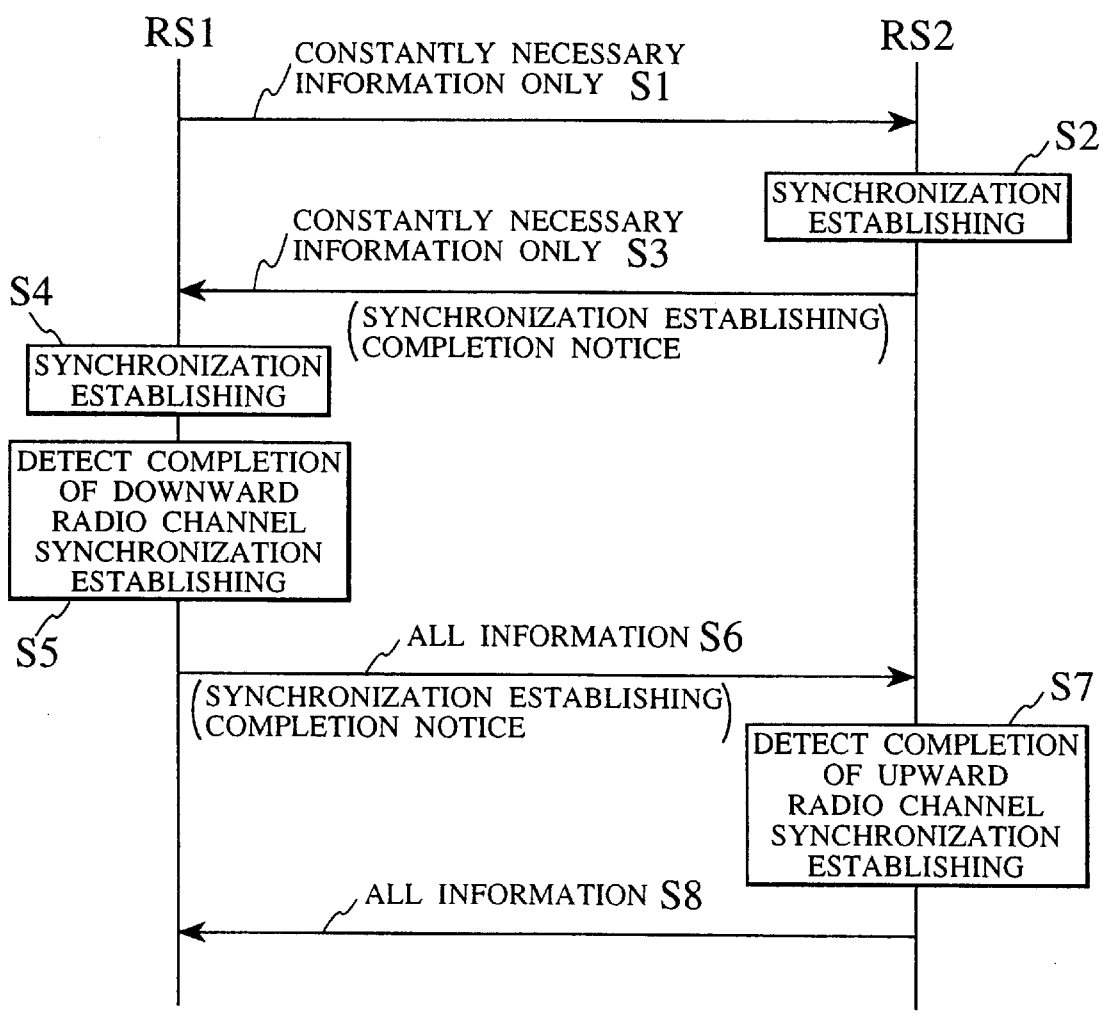
FIG. 3 is a sequence chart of an operation at a time of radio channel set up according to the present invention, for one exemplary case of using a synchronization information as a constantly necessary information.
Figure 4:
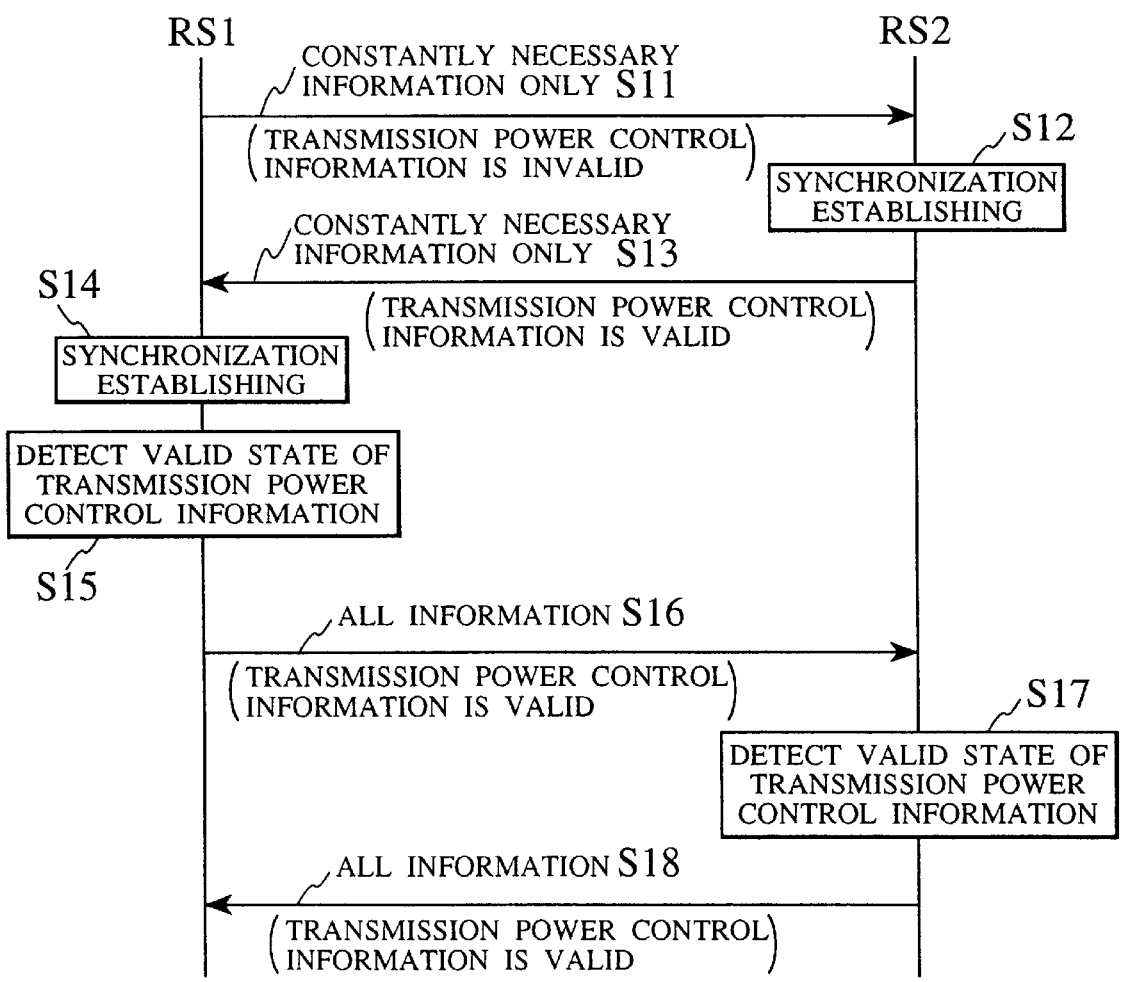
FIG. 4 is a sequence chart of an operation at a time of radio channel set up according to the present invention, for another exemplary case of using a synchronization information and a transmission power control information as a constantly necessary information.

Referring now to FIG. 2 to FIG. 4, one embodiment of a radio channel initial transmission scheme for a mobile communication system according to the a present invention will be described in detail.

FIG. 2 shows an exemplary configuration of a radio station apparatus for realizing the radio channel initial transmission scheme for a mobile communication system according to the present invention, which can constitute each of a base station and a mobile station of the mobile communication system. This configuration of FIG. 2 only shows a part which is related to the radio channel initial transmission scheme of the present invention, and this part is common to both the base station and the mobile station, The radio station apparatus of FIG. 2 has a control unit 20 for carrying out an overall control, from which command signals are supplied to a transmission power control information generation unit 1, a synchronization state notice information generation unit 2, a synchronization information generation unit 3, and a user information generation unit 4.

The transmission power control information generation unit 1 generates a transmission power control information in such a form that a correspondent station can recognize a valid/invalid state of the transmission power control information transmitted from this station, and supplies the generated transmission power control information to a constantly necessary information formation unit 5, according to a command from the control unit 20. Here, in a case of the transmission power control information in a valid state, the transmission power control information generation unit 1 generates the transmission power control information for commanding raising/lowering of a transmission power to the correspondent station according to a receiving quality notified from a receiving quality measurement unit 16, and this generated transmission power control information is supplied to tile constantly necessary information formation unit 5.

The synchronization state notice information generation unit 2 generates a synchronization state notice information for indicating a synchronization establishing OK/NG as specified from the control unit 20, and supplies the generated synchronization state notice information to the constantly necessary information formation unit 5.

The synchronization information generation unit 3 periodically generates a synchronization information, and supplies the generated synchronization information to the constantly necessary information formation unit 5, according to a command from the control unit 20.

The user information generation unit 4 forms a user information in a prescribed format from an original user information supplied by the control unit 20, and supplies the generated user information to a general information formation unit 6.

The constantly necessary information formation unit 5 forms a constantly necessary information containing the synchronization received from the synchronization information generation unit 3, the transmission power control information received from the transmission power control information generation unit 1, and the synchronization state notice information received from the synchronization state notice information generation unit 2, and supplies the formed constantly necessary information to a signal format formation unit 7.

The general information formation unit 6 forms a general information which is information other than the constantly necessary information and containing the user information, and supplied the formed general information to the signal format formation unit 7. Here, the general information formation unit 6 is controlled not to carry out the formation of the general information as well as the supply of the general information to the signal format formation unit 7 unless a supply permission signal is given from the control unit 20.

The signal format formation unit 7 forms a signal format for transmission signals from the constantly necessary information received from the constantly necessary information formation unit 5 and the general information received from the general information formation unit 6, and supplies the transmission signals in the formed signal format to an encoding unit 8. Here, the signal format formation unit 7 leaves portions for placing the general information on the signal format in an empty state when the general information is not supplied from the general information formation unit 6.

The transmission signals in the signal format formed by the signal format formation unit 7 are then encoded by the encoding unit 8, modulated by a modulation unit 9, and supplied to a transmission unit 10.

The transmission unit 10 applies a processing such as D/A conversion, frequency conversion, and amplification to the transmission signals encoded and modulated by the encoding unit 8 and the modulation unit 9, and transmits the resulting transmission signals to the correspondent station from an antenna 21 through a duplexer 12. Here, the amplification is made so as to realize a transmission power value specified from a transmission power determining unit 11. In addition, the transmission unit 10 carries out a transmission control for not transmitting empty state portions in the signal format formed by the signal format formation unit 7.

On the other hand, the transmission signals transmitted from the correspondent station are received by the antenna 21, and supplied to a demodulation unit 14 through the duplexer 12 and a reception unit 13. The demodulation unit 14 demodulates received signals, and supplies demodulated signals to a synchronization establishing unit 15 and a receiving quality measurement unit 16.

The synchronization establishing unit 15 establishes a frame synchronization on the demodulated signals, and supplies a synchronization timing signal along with the demodulated signals to a transmission power control information extraction unit 18, a synchronization state notice information extraction unit 19 and a decoding unit 17, while notifying an information indicating a synchronization state (synchronization establishing OK/NG) to the control unit 20.

The receiving quality measurement unit 16 measures a receiving quality of the demodulated signals, and supplies a measured value to the transmission power control information generation unit 1.

The transmission power control information extraction unit 18 extracts a transmission power control information from the demodulated signals according to the synchronization timing signal, and supplies the extracted transmission power control information to the transmission power determining unit 11 and the control unit 20.

The transmission power determining unit 11 determines a transmission power value according to the transmission power control information supplied from the transmission power control information extraction unit 18, and notifies the determined transmission power value to the transmission unit 10.

The synchronization state notice information extraction unit 19 extracts a synchronization state notice information from the demodulated signals according to the synchronization timing signal, and supplies the extracted synchronization state notice information to the control unit 20.

Note here that the radio station apparatus of FIG. 2 can be made applicable to the CDMA mobile communication by carrying out the usual modulation and the spreading using a spread code on the transmission signals in the signal format formed by the signal format formation unit 7 at the modulation unit 9, and the usual demodulation and the despreading using a spread code on the received signals at the demodulation unit 14.

Next, with reference to the sequence chart of FIG. 3, the operation by the radio station apparatus of FIG. 2 will be described in detail.

Note here that the sequence chart of FIG. 3 shows the operation between the base station and the mobile station at a time of radio channel set up where the base station and the mobile station have the identical configuration as shown FIG. 2, and this operation is valid regardless of which one of the base station and the mobile station becomes a radio channel set up starting side. Consequently, FIG. 3 shows two radio stations RS1 and RS2 without specifying which radio station is the base station and which radio station is the mobile station. Either one of the radio stations RS1 and RS2 is the base station while the other one is the mobile station.

Note also that, in the following description of the operation of FIG. 3, a signal flow from the radio station RS1 to the radio station RS2 will be referred to as downward while a signal flow from the radio station RS2 to the radio station RS1 will be referred to as upward for the sake of convenience.

Note also that the operation of FIG. 2 is directed to an exemplary case of using the synchronization information and the synchronization state notice information as the constantly necessary information, without using the transmission power control information.

At a time of setting up a downward radio channel to the radio station RS2, the control unit 20 of the radio station RS1 commands the generation of the synchronization state notice information and the synchronization information to the synchronization state notice information generation unit 2 and the synchronization information generation unit 3, respectively, while not supplying the original user information to the user information generation unit 4 and not permitting the general information formation processing to the general information formation unit 6, because the synchronization with the correspondent radio station RS2 has not yet been established at the beginning of the radio channel set up.

In this case, an information indicating the synchronization establishing NG is set to the synchronization state notice information. As already mentioned above, FIG. 2 is directed to an exemplary case in which the constantly necessary information is formed from the synchronization state notice information and the synchronization information without using the transmission power control information.

The generated synchronization state notice information and synchronization information are supplied to the constantly necessary information formation unit 5, and the constantly necessary information containing these information is formed therein. This constantly necessary information is then supplied to the signal format formation unit 7, and the signal format of the transmission signals is formed therein. Here, in an initial period of the radio channel set up where the synchronization has not yet been established, the general information is not supplied from the general information formation unit 6 so that the signal format formation unit 7 leaves the portions for placing the general information on the signal format in an empty state.

The transmission signals in such a signal format which is formed only from the constantly necessary information without using the general information are then encoded by the encoding unit 8, modulated by the modulation unit 9, and supplied to the transmission unit 10. At the transmission unit 10, the transmission signals are applied with a processing such as D/A conversion, frequency conversion and amplification, and transmitted to the radio station RS2 from the antenna 21 through the duplexer 12 (S1 of FIG. 3).

At the radio station RS2, the transmission signals formed only from the constantly necessary information containing the synchronization state notice information and the synchronization information on the downward radio channel transmitted from the radio station RS1 are received by the reception unit 13 through the antenna 21 and the duplexer 12, and demodulated by the demodulation unit 14. The demodulated signals are then supplied to the synchronization establishing unit 15 at which the frame synchronization for the downward radio channel is established according to the synchronization information (S2 of FIG. 3).

Then, the synchronization timing signal and the demodulation signals are supplied to the synchronization state notice information extraction unit 19 and the decoding unit 17 while an information indicating the synchronization state is supplied to the control unit 20. Here, in a state where the radio channel set up processing from the radio station RS1 is just started, the synchronization is not yet established so that the information indicating the synchronization state is the synchronization establishing NG as described above.

When the synchronization establishing for the downward radio channel is completed, the control unit 20 of the radio station RS2 commands the generation of the synchronization state notice information indicating the synchronization establishing OK and the synchronization information to the synchronization state notice information generation unit 2 and the synchronization information generation unit 3, respectively, in order to set up an upward radio channel to the radio station RS1 similarly as in a case of the downward radio channel set up by the radio station RS1.

The generated synchronization state notice information and synchronization information are then supplied to the constantly necessary information formation unit 5, and the constantly necessary information is formed therein. This constantly necessary information is then supplied to the signal format formation unit 7, and the signal format of the transmission signals is formed only from the constantly necessary information therein. Here, in Here, in a state where the radio channel set up processing from the radio station RS2 is just started, the general information from the general information formation unit 6 is not supplied, so that only the constantly necessary information is transmitted to the radio station RS1 on the upward radio channel, while the synchronization state notice information indicating that the synchronization establishing for the downward radio channel is completed (synchronization establishing OK) is notified to the radio station RS1 (S3 of FIG. 3).

At the radio station RS1, the transmission signals formed only from the constantly necessary information containing the synchronization state notice information and the synchronization information on the upward radio channel transmitted from the radio station RS2 are received by the reception unit 13 through the antenna 21 and the duplexer 12, and demodulated by the demodulation unit 14. The demodulated signals are then supplied to the synchronization establishing unit 15 at which the frame synchronization for the upward radio channel is established according to the synchronization information (S4 of FIG. 3).

Then, the synchronization timing signal and the demodulation signals are supplied to the synchronization state notice information extraction unit 19 and the decoding unit 17 while an information indicating the synchronization state of the downward radio channel as the synchronization establishing OK is supplied to the control unit 20.

When the completion of the synchronization establishing for the downward radio channel is detected according to this information indicating the synchronization establishing OK (S5 of FIG. 3), the control unit 20 of the radio station RS1 supplies the original user information to the user information generation unit 4 while permitting the general information formation processing to the general information formation unit 6 so as to carry out the transmission of all information including the constantly necessary information as well the general information on the downward radio channel.

The general information formed by the general information formation unit 6 is supplied to the signal format formation unit 7, and the signal format formed from the all information including the constantly necessary information and the general information is formed by the signal format formation unit 7. Then, the transmission of the all information including the constantly necessary information and the general information on the downward radio channel from the radio station RS1 is started, while the completion of the synchronization establishing for the upward radio channel is notified to the radio station RS2 by the synchronization state notice information on the downward radio channel (S6 of FIG. 3).

When the downward radio channel from the radio station RS1 is received, the radio station RS2 detects the completion of the synchronization establishing for the upward radio channel according to the synchronization state notice information on the downward radio channel (S7 of FIG. 3), and the transmission of the all information including the constantly necessary information and the general information on the upward ratio channel from the radio station RS2 to the radio station RS1 is started similarly as in a case of the downward radio channel described above (S8 of FIG. 3).

Next, with reference to the sequence chart of FIG. 4, the operation by the radio station apparatus of FIG. 2 in an exemplary case of also transmitting the transmission power control information as the constantly necessary information will be described in detail. Here, the same remarks as noted above for FIG. 3 also apply.

The operation of FIG. 4 differs from that of FIG. 3 in that the transmission power control information generated by the transmission power control information generation unit 1 is also included in the constantly necessary information, and the transmission power of the transmission signals is controlled by the transmission power determining unit 11 according to this transmission power control information, while the receiving quality of the signals received from the correspondent radio station is measured by the receiving quality measurement unit 16, and the transmission power control information generation unit 1 determines the transmission power control information according to this receiving quality.

In addition, the transmission power control information generated by the transmission power control information generation unit 1 is set in an invalid state during an initial period at which the radio channel set up is started, and then set in a valid state when the signals from the correspondent radio station are received and their receiving quality is measured.

The internal operation of each radio station in a configuration of FIG. 2 during the operation of FIG. 4 differs from that in a case of the operation of FIG. 3 in that the transmission power control information generation unit 1 generates the transmission power control information and supplies the generated transmission power control information to the constantly necessary information formation unit 5 according to the command from the control unit 20, the transmission power control information extraction unit 18 extracts the transmission power control information from the signals received from the correspondent radio station, and the transmission power determining unit 11 determines the transmission power value according to this extracted transmission power control information and controls the transmission power of the transmission signals from the transmission unit 10 according to this determined transmission power value, while the receiving quality of the received signals measured by the receiving quality measurement unit 16 is supplied to the transmission power control information generation unit 1 so that the transmission power control information is determined according to this receiving quality.

In the operation of FIG. 4, at a time of setting up the downward radio channel to the radio station RS2, the radio station RS1 transmits only the constantly necessary information containing the synchronization information and the transmission power control information on the downward radio channel, without transmitting the general information from the general information formation unit 6. Also, at a time of radio channel set up start, the transmission power control information is set in an invalid state (S11 of FIG. 4).

When the downward radio channel from the radio station RS1 is received, the radio station RS2 establishes the synchronization for the downward radio channel according to the synchronization information on the downward radio channel (S12 of FIG. 4).

In addition, the radio station RS2 transmits only the constantly necessary information containing the synchronization information and the transmission power control information on the upward radio channel, without transmitting the general information. In this case, the radio station RS2 has already received the downward radio channel from the radio station RS1 and determined the transmission power control information at the transmission power control information generation unit 1 according to the receiving quality of the received signals, so that the transmission power control information on the upward radio channel is set in a valid state (S13 of FIG. 4).

When the upward radio channel from the radio station RS2 is received, the radio station RS1 establishes the synchronization for the upward radio channel according to the synchronization information on the upward radio channel (S14 of FIG. 4).

In addition, the radio station RS1 detects the valid state of the transmission power control information on the upward radio channel (S15 of FIG. 4), and starts transmitting the all information including the constantly necessary information and the general information on the downward radio channel (S16 of FIG. 4). In this case, the radio station RS1 adjusts the transmission power of the downward radio channel at the transmission power determining unit 11 according to the transmission power control information on the upward radio channel from the radio station RS2, and sets the transmission power control information on the downward radio channel in a valid state, while measuring the receiving quality of the upward radio channel at the receiving quality measurement unit 16 and generating the transmission power control information at the transmission power control information generation unit 1 according to the measured receiving quality.

When the downward radio channel from the radio station RS1 is received, the radio station RS2 detects the valid state of the transmission power control information on the downward radio channel (S17 of FIG. 4), and starts transmitting the all information including the constantly necessary information and the general information on the upward radio channel (S18 of FIG. 4). In this case, the radio station RS2 adjusts the transmission power of the upward radio channel at the transmission power determining unit 11 according to the transmission power control information on the downward radio channel from the radio station RS1. Here, the transmission power control information on the upward radio channel to be transmitted from the radio station RS2 is obviously set in a valid state.

Note that, in FIG. 4, when the transmission power control information is detected to be in a valid state, it obviously implies that the synchronization establishing has already been completed by that time, so that this valid state of the transmission power control information can be effectively regarded as a notice indicating both a completion of the synchronization establishing and a start of the transmission power control. Alternatively, it is also possible to provide an explicit notice indicating a completion of the synchronization establishing and a start of the transmission power control by simply combining the operation of FIG. 3 and the operation of FIG. 4, if desired.

As described, according to the present invention, only the constantly necessary information portion is transmitted first at a time of radio channel set up start, and then the other general information is transmitted in addition to the constantly necessary information when a receiving side becomes ready to receive the radio channel properly, so that the other general information is not transmitted until a receiving side becomes ready to receive the radio channel properly, and therefore the other general information does not cause an unnecessary interference with respect to the other radio channels and an unnecessary consumption of a battery of the mobile station in the uplink radio channel.

Also, in one exemplary case of the present invention, the synchronization information is transmitted as the constantly necessary information first, and then after the synchronization is established, the other general information is transmitted in addition to the synchronization information, so that the other general information is not transmitted until the synchronization is established, and therefore the other general information does not cause an unnecessary interference with respect to the other radio channels and an unnecessary consumption of a battery of the mobile station in the uplink radio channel.

Also, in another exemplary case of the present invention, the synchronization information and the transmission power control information are transmitted as the constantly necessary information first, and then after the synchronization is established and the transmission power control is started, the other general information is transmitted in addition to the synchronization information and the transmission power control information, so that the other general information is not transmitted until the synchronization is established and the transmission power control is started, and therefore the other general information does not cause an unnecessary interference with respect to the other radio channels and an unnecessary consumption of a battery of the mobile station in the uplink radio channel.

In particular, in a case of the CDMA mobile communication system, an amount of interference significantly affects a system capacity, but the present invention can prevent a lowering of a system capacity by preventing an unnecessary increase of interference, so that the radio channel initial transmission scheme of the present invention is very effective in the CDMA mobile communication system.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of radio channel initial transmission in a mobile communication system in which a base station and a mobile station carry out communication through radio channels, the method comprising the steps of:
   (a) initially transmitting only constantly necessary information among radio channel transmission signals, from a transmitting side station which comprises one of the base station and the mobile station, at a time of setting up a radio channel between the base station and the mobile station; and
   (b) subsequently transmitting the constantly necessary information and general information other than the constantly necessary information from the transmitting side station, after a receiving side station which comprises an other one of the base station and the mobile station not used as a transmit side station becomes ready to receive the radio channel properly.

2. The method of claim 1, wherein the constantly necessary information includes a synchronization information.

3. The method of claim 2, further comprising the step of:
   (c) establishing a synchronization at the receiving side station by using the synchronization information transmitted at the step (a), and notifying a completion of synchronization establishing from the receiving side station to the transmitting side station; wherein the transmitting side station transmits the constantly necessary information and the general information at the step (b) when the completion of synchronization establishing is notified by the step (c).

4. The method of claim 1, wherein the constantly necessary information includes a synchronization information and a transmission power control information.

5. The method of claim 4, further comprising the step of:
   (d) establishing a synchronization at the receiving side station by using the synchronization information transmitted at the step (a) while starting a transmission power control at the receiving side station by using the transmission power control information transmitted at the step (a), and notifying a completion of synchronization establishing and a start of transmission power control from the receiving side station to the transmitting side station; wherein the transmitting side station transmits the constantly necessary information and the general information at the step (b) when the completion of synchronization establishing and the start of transmission power control information are notified by the step (d).

6. The method of claim 1, wherein the mobile communication system is a CDMA mobile communication system.

7. A radio station apparatus for use as one of a base station and a mobile station in a mobile communications system in which the base station and the mobile station carry out communications through radio channels, comprising:
   a constantly necessary information generation unit configured to generate constantly necessary information among radio channel transmission signals;
   a general information generation unit configured to generate general information other than the constantly necessary information; and
   a transmission unit configured to initially transmit only the constantly necessary information at a time of setting up a radio channel between the base station and the mobile station, and subsequently transmit the constantly necessary information and the general information, after one of the base station and the mobile station becomes ready to receive the radio channel properly.

8. The radio station apparatus of claim 7, wherein the constantly necessary information generation unit generates the constantly necessary information which includes a synchronization information.

9. The radio station apparatus of claim 8, further comprising:
- a synchronization establishing unit for establishing a synchronization by using the synchronization information transmitted from said another radio station;
- wherein the transmission unit also transmits a notice of a completion of synchronization establishing to said another radio station when the synchronization establishing unit established the synchronization, and said another radio station transmits the constantly necessary information and the general information when the completion of synchronization establishing is notified.

10. The radio station apparatus of claim 7, wherein the constantly necessary information generation unit generates the constantly necessary information which includes a synchronization information and a transmission power control information.

11. The radio station apparatus of claim 10, further comprising:
- a synchronization establishing unit for establishing a synchronization by using the synchronization information transmitted from said another radio station;
- a transmission power control unit for controlling a transmission power of the transmission unit by using the transmission control information transmitted from said another radio station;
- wherein the transmission unit also transmits a notice of a completion of synchronization establishing and a start of transmission power control to said another radio station when the synchronization establishing unit established the synchronization and the transmission power control unit started a transmission power control, and said another radio station transmits the constantly necessary information and the general information when the completion of synchronization establishing and the start of transmission power control are notified.

12. The radio station apparatus of claim 7, wherein the mobile communication system is a CDMA mobile communication system so that the transmission unit transmits the radio channel transmission signals according to a CDMA scheme.

* * * * *